(12) United States Patent
Jeon (10) Patent No.: US 10,882,385 B2
(45) Date of Patent: Jan. 5, 2021

(54) COVER APPARATUS FOR TRUCK CARGO BOX

(71) Applicant: Hyeon Cheol Jeon, Yangsan-si (KR)

(72) Inventor: Hyeon Cheol Jeon, Yangsan-si (KR)

( * ) Notice: Subject to any disclaimer, the term of this patent is extended or adjusted under 35 U.S.C. 154(b) by 32 days.

(21) Appl. No.: 16/476,177

(22) PCT Filed: Feb. 13, 2018

(86) PCT No.: PCT/KR2018/001863
§ 371 (c)(1),
(2) Date: Jul. 5, 2019

(87) PCT Pub. No.: WO2018/151496
PCT Pub. Date: Aug. 23, 2018

(65) Prior Publication Data
US 2019/0366821 A1 Dec. 5, 2019

(30) Foreign Application Priority Data

Feb. 16, 2017 (KR) .................. 10-2017-0020825

(51) Int. Cl.
*B60J 7/14* (2006.01)
*B60P 7/02* (2006.01)
(Continued)

(52) U.S. Cl.
CPC . *B60J 7/14* (2013.01); *B60P 7/02* (2013.01); *B62D 33/0207* (2013.01); *E05D 3/10* (2013.01);
(Continued)

(58) Field of Classification Search
CPC ....... B60J 7/04; B60J 7/041; B60J 7/14; B60J 7/141; B60J 7/16; B60J 7/1607;
(Continued)

(56) References Cited

U.S. PATENT DOCUMENTS

| | | | | |
|---|---|---|---|---|
| 4,767,152 A | * | 8/1988 | Stluka | B60J 7/141 296/100.1 |
| 6,227,608 B1 | * | 5/2001 | Hoyne | B60J 7/1621 296/100.1 |
| 6,402,224 B1 | * | 6/2002 | Monaco | B60J 7/141 296/100.06 |
| 8,720,970 B1 | * | 5/2014 | Fletcher | B60J 7/141 296/100.09 |

(Continued)

FOREIGN PATENT DOCUMENTS

| | | |
|---|---|---|
| KR | 10-1999-0046487 A | 7/1999 |
| KR | 1999-0035380 U | 9/1999 |

(Continued)

*Primary Examiner* — Gregory A Blankenship
(74) *Attorney, Agent, or Firm* — KORUS Patent, LLC; Seong Ii Jeong (57) ABSTRACT

The present invention relates to a cover apparatus for a truck cargo box, and more specifically to a cover apparatus for a truck cargo box, which enables stable opening and closing operations even when deformation occurs due to the deflection or warping of a truck cargo box and enables its covers to stably cover irregularly shaped loads, such as various types of wastes or scraps, thereby considerably improving transportation safety and the convenience of use. According to the present invention, there is provided the cover apparatus for a truck cargo box, which enables stable opening and closing operations via the hinges and the variable members, and enables its covers to stably cover irregularly shaped loads via the covers in each of which the plurality of blocks is connected to each other, thereby providing the effect of considerably improving transportation safety and the convenience of use.

4 Claims, 9 Drawing Sheets

(51) Int. Cl.
*E05F 15/63* (2015.01)
*B62D 33/02* (2006.01)
*E05D 3/10* (2006.01)
*E05D 7/04* (2006.01)

(52) U.S. Cl.
CPC ............... *E05D 7/04* (2013.01); *E05F 15/63* (2015.01); *B60Y 2200/142* (2013.01); *E05D 2007/0484* (2013.01); *E05Y 2900/548* (2013.01)

(58) Field of Classification Search
CPC .. B60J 7/1621; B60P 7/02; B60P 7/04; E05D 3/10; E05D 7/04; E05D 2007/0484; E05F 15/63; E05Y 2900/516; E05Y 2900/548; E05Y 2200/142; B62D 33/0207
USPC ... 296/185.1, 100.01, 100.02, 100.05–100.1, 296/136.03–136.06
See application file for complete search history.

(56) References Cited

U.S. PATENT DOCUMENTS

| | | | |
|---|---|---|---|
| 2012/0261939 A1* | 10/2012 | Schmeichel | B60P 7/04 296/98 |
| 2014/0191531 A1* | 7/2014 | Castillo | B60P 7/02 296/100.02 |
| 2018/0050739 A1* | 2/2018 | Maertens | E05D 3/125 |
| 2018/0244138 A1* | 8/2018 | Lees | B60J 10/90 |
| 2018/0265140 A1* | 9/2018 | Napoli | B62D 33/03 |
| 2019/0366821 A1* | 12/2019 | Jeon | B62D 33/0207 |

FOREIGN PATENT DOCUMENTS

| KR | 10-2009-0114584 A | 11/2009 |
|---|---|---|
| KR | 10-2010-0124379 A | 11/2010 |
| KR | 10-2011-0095478 A | 8/2011 |
| KR | 10-1091963 B1 | 12/2011 |
| KR | 10-2016-0112725 A | 9/2016 |

* cited by examiner

COVER APPARATUS FOR TRUCK CARGO BOX

TECHNICAL FIELD

The present invention relates to a cover apparatus for a truck cargo box, and more specifically to a cover apparatus for a truck cargo box, which enables stable opening and closing operations even when deformation occurs due to the deflection or warping of a truck cargo box and enables its covers to stably cover irregularly shaped loads, such as various types of wastes or scraps, thereby considerably improving transportation safety and the convenience of use.

BACKGROUND ART

Generally, various types of freight vehicles, such as dump trucks, are required to cover a load in order to secure transportation safety by preventing the load from being scattered or falling during operation after the load, such as scrap iron, earth and sand, or construction waste, has been loaded into a cargo box. For this, road traffic safety regulations are being tightened in individual countries. In particular, in Korea, freight vehicles without a cover or with a faulty cover are being intensively cracked down on, and fines or penalties are being imposed on vehicles without a cargo box cover in accordance with the road traffic act.

Accordingly, recently, in order to overcome the operational inconvenience of covering a cargo box through a manual operation, various apparatuses for automatically covering a cargo box have been proposed. The cover apparatus for a truck cargo box, which is disclosed in Korean Patent Application Publication No. 10-2006-0111762 (filed on Oct. 30, 2006), is representative of the various apparatuses. Referring to this publication, the cover apparatus for a truck cargo box is configured to include a cover which selectively opens and closes the top opening of the cargo box of a truck, hinges which hinge the cover into the cargo box of the truck, packing member coupling portions which is coupled to the truck cargo box, and packing members which are coupled to the coupling portions, thereby preventing foreign materials from falling down when the vehicle is running by preventing the foreign materials from being caught between the coupling portions and the truck cargo box. Although this cover apparatus has the advantage of preventing the foreign materials from being caught between the coupling portions and the truck cargo box, deformation may occur due to the sagging or twisting of the truck cargo box during repeated loading. In this case, a defect arises in that at least any one of the plurality of hinge portions is removed from the same horizontal line, and thus the opening and closing operation itself becomes impossible.

In order to solve this problem, there have been a lot of inconvenience of use, such as frequent maintenance. Furthermore, the cover is made of a single plate, and, thus cannot completely cover loads, such as various types of wastes and scraps having irregular shapes, and thus a disadvantage arises in that transportation safety cannot be secured.

DISCLOSURE

Technical Problem

The present invention has been conceived to overcome the above-described problems, and an object of the present invention is to provide a cover apparatus for a truck cargo box, which enables stable opening and closing operations even when deformation occurs due to the deflection or warping of a truck cargo box and enables its covers to stably cover irregularly shaped loads, such as various types of wastes or scraps, thereby considerably improving transportation safety and the convenience of use.

Technical Solution

In order to accomplish the above object, the present invention provides a cover apparatus for a truck cargo box, the cover apparatus including: a plurality of hinge units which is attached in the longitudinal directions of a truck cargo box, and each of which includes a fixed element attached to the top surface of a side wall of the truck cargo box and a rotating element coupled to the fixed element via a cross-shaped hinge so that it can be hinged in widthwise and lengthwise directions of the cargo box; variable members which are coupled to the tops of the hinge units, and the lengths of which are variable in accordance with defamation of the shape of the cargo box; covers which are coupled to the tops of the variable members, and which selectively open and close the top opening of the cargo box in response to the hinge operations of the hinge units; and rotational driving means which enable the opening and closing operations of the covers to be automatically performed.

Preferably, each of the variable members may include: a piston rod which is coupled to the top surface of the rotating element of the hinge unit, and on an end of which is formed a support protrusion protruding outward; a cylinder which is coupled to the upper end of the piston rod, which is vertically movably, and on the top of which is provided a coupling portion configured to couple the cover; and spring member which provide elastic force by supporting the top and bottom of the support protrusion of the piston rod inside the cylinder.

Preferably, each of the covers may be configured in such a manner that a plurality of blocks is coupled to one another, and the individual blocks may be configured to be connected via hinge assemblies in order to be bent, thereby enabling the covers to cover a load having an irregular shape, loaded into the cargo box, while flexibly dealing with the load.

Preferably, the cover may include at least two rows formed in the widthwise directions of the cargo box.

Advantageous Effects

According to the present invention, there is provided the cover apparatus for a truck cargo box, which enables stable opening and closing operations via the hinges each having the cross-shaped hinge and the variable members each having a variable length even when deformation occurs due to the deflection or warping of a truck cargo box, and enables its covers to stably cover irregularly shaped loads, such as various types of wastes or scraps, via the covers in each of which the plurality of blocks is connected to each other, thereby providing the effect of considerably improving transportation safety and the convenience of use.

100: cover apparatus for a truck cargo box 110: hinge
112: fixed element 114: cross-shaped hinge
116: rotating element 118: cutout hole
120: variable member 122: piston rod
123: support protrusion 124: cylinder
126: spring member 128: coupling portion
130: cover 132: block
134: hinge assembly 135: slide hole
136: bracket 138: wire
139: auxiliary cover 140: rotational driving means
142: operation rod 142a: stop protrusion
143: coupling shaft 144: rotation motor
146: connection bar 146a: slide hole
150: guide bar 152: bearing
200: cargo box

BEST MODE

A cover apparatus for a truck cargo box according to the present invention will be described in greater detail below with reference to the accompanying drawings.

Prior to the detailed description, it should be noted that the terms or words used in the present specification and the claims should not be interpreted as being limited to common or dictionary meanings, but should be interpreted as having meanings and concepts suitable for the technical spirit of the invention based on the principle that an inventor may appropriately define the concepts of terms in order to describe his or her invention in the best way.

Accordingly, the embodiments described in present specification and the configurations shown in the drawings are merely the most preferred embodiments of the invention and do not represent the overall technical spirit of the invention, so that it should be understood that there may be various equivalents and modifications that can replace the embodiments at the time when the present application is filed.

Figure 1:
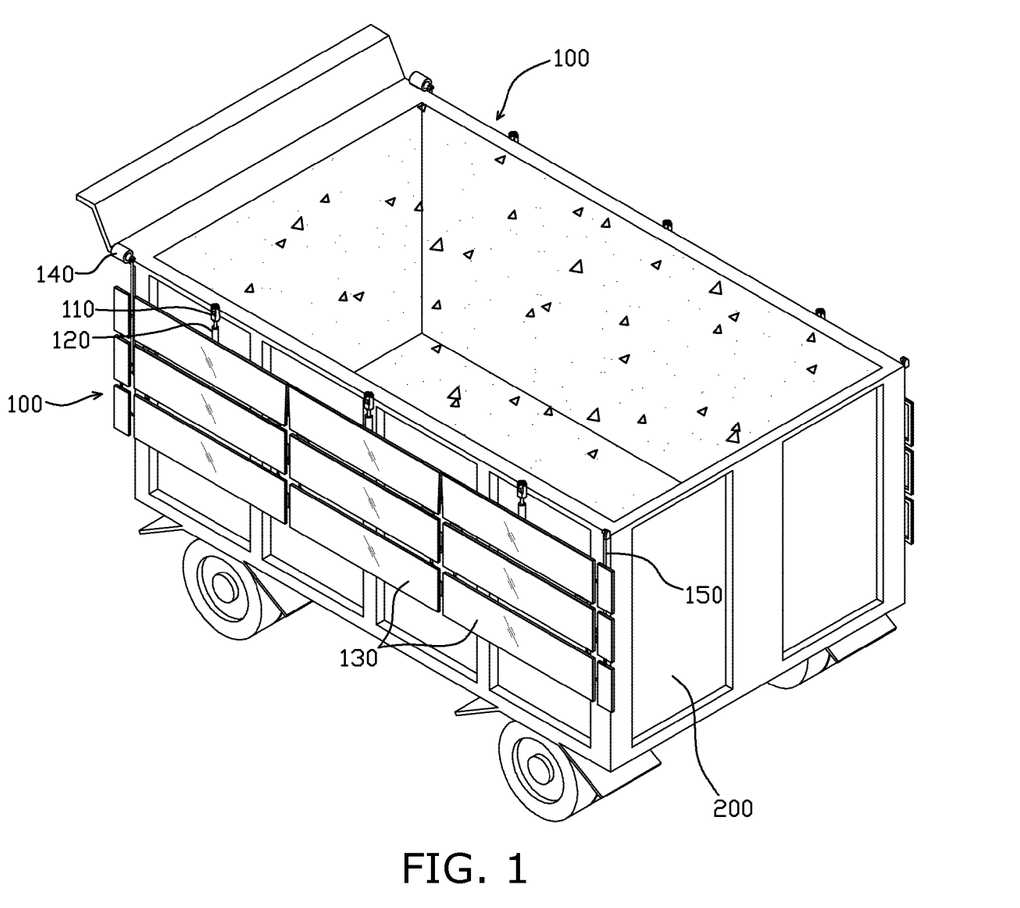
FIG. 1 is a perspective view showing a state in which a cover apparatus for a truck cargo box according to a preferred embodiment of the present invention has been installed.
Figure 2:
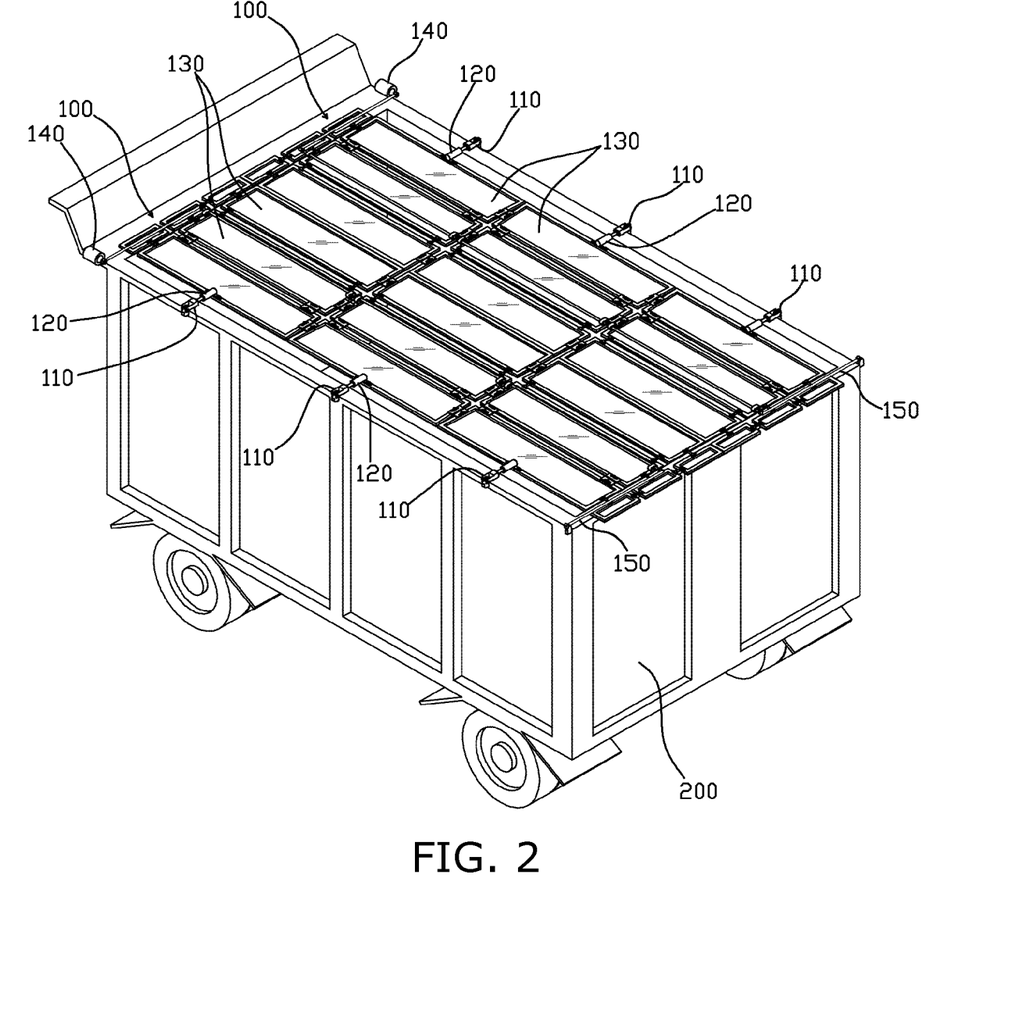
FIG. 2 is a perspective view showing a state in which the cover apparatus for a truck cargo box according to the preferred embodiment of the present invention covers a cargo box.

FIG. 1 is a perspective view showing a state in which a cover apparatus for a truck cargo box according to a preferred embodiment of the present invention has been installed, and FIG. 2 is a perspective view showing a state in which the cover apparatus for a truck cargo box according to the preferred embodiment of the present invention covers a cargo box.

Referring to FIGS. 1 and 2, a cover apparatus 100 for a truck cargo box according to the present invention is symmetrically installed on opposite sides of the top surface of a truck cargo box 200, and is installed to selectively open and close the top opening of the cargo box 200. As shown in FIG. 1, a load is loaded into the cargo box 200 in a state in which the top opening of the cargo box 200 has been opened. As shown in FIG. 2, when a loading process is completed, the top opening of the cargo box 200 is covered.

The cover apparatus 100 for a truck cargo box is configured to basically include a plurality of hinge units 110 which is disposed on the top surfaces of the side walls of the cargo box 200 in longitudinal directions, variable members 120 which are coupled to the tops of the hinge units 110 and the lengths of which are variable, covers 130 which are coupled to the tops of the variable members 120 and which selectively open and close the top opening of the cargo box 200, and rotational driving means 140 which enable the opening and closing operations of the covers 130 to be automatically performed. The detailed configurations and operations of the hinge units 110, the variable members 120, the covers 130, and the rotational driving means 140 will be described in detail below.

Figure 3:
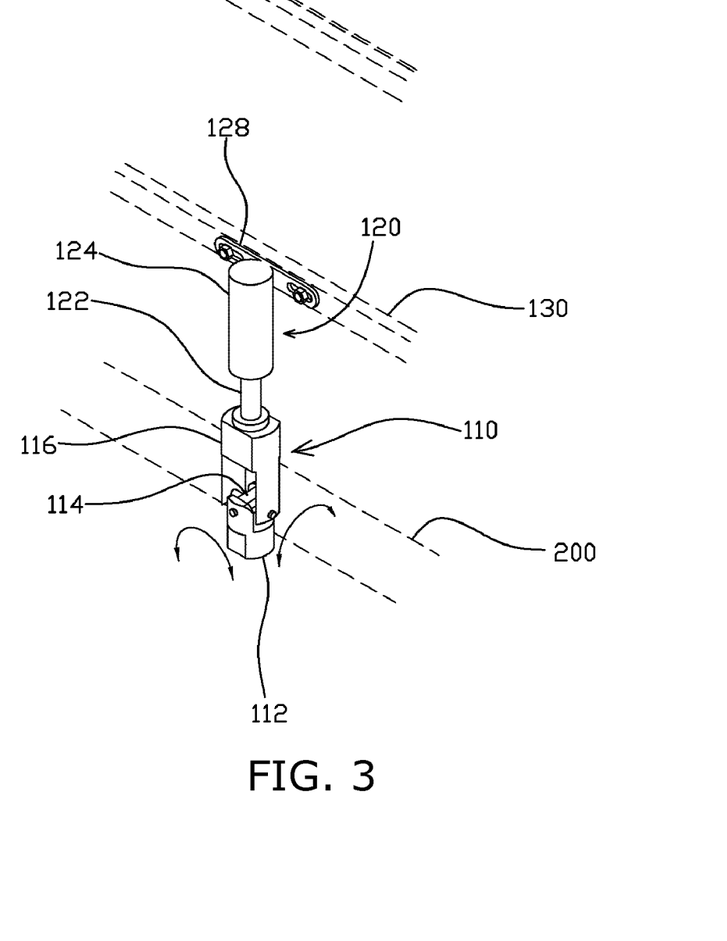
FIG. 3 is an enlarged perspective view showing a hinge unit and a variable member according to a preferred embodiment of the present invention.
Figure 4:
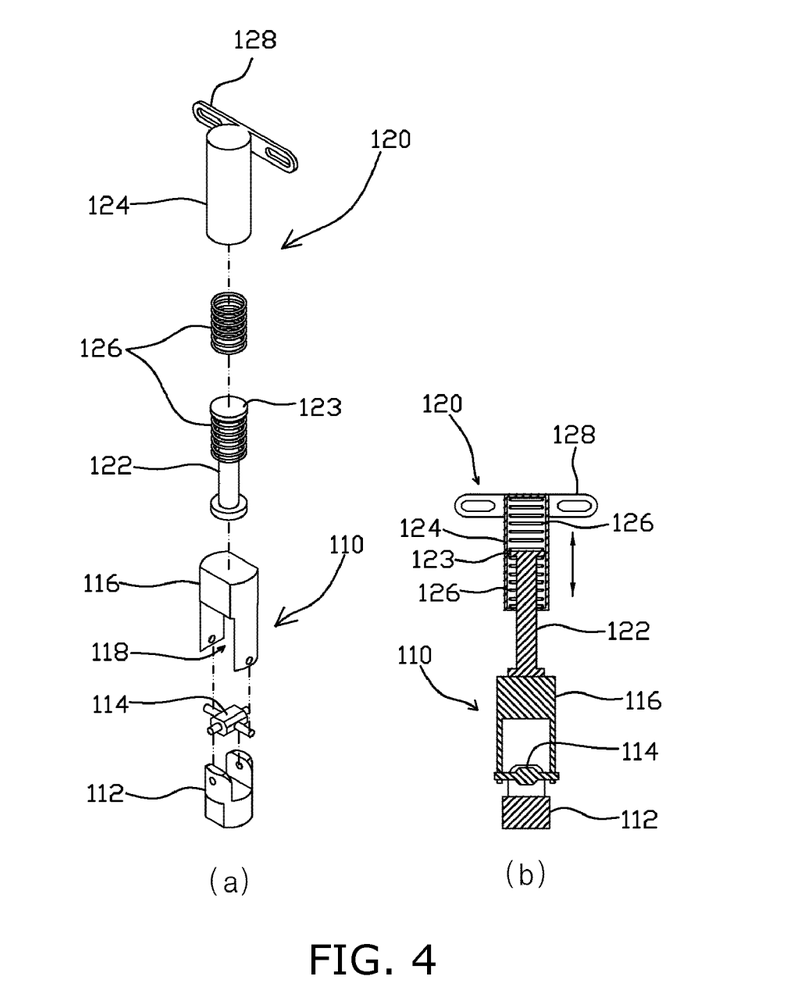
FIG. 4(a) is an exploded perspective view showing the hinge unit and the variable member according to the preferred embodiment of the present invention.
FIG. 4(b) is a longitudinal sectional view showing the coupling between the hinge unit and the variable member.
Figure 5:
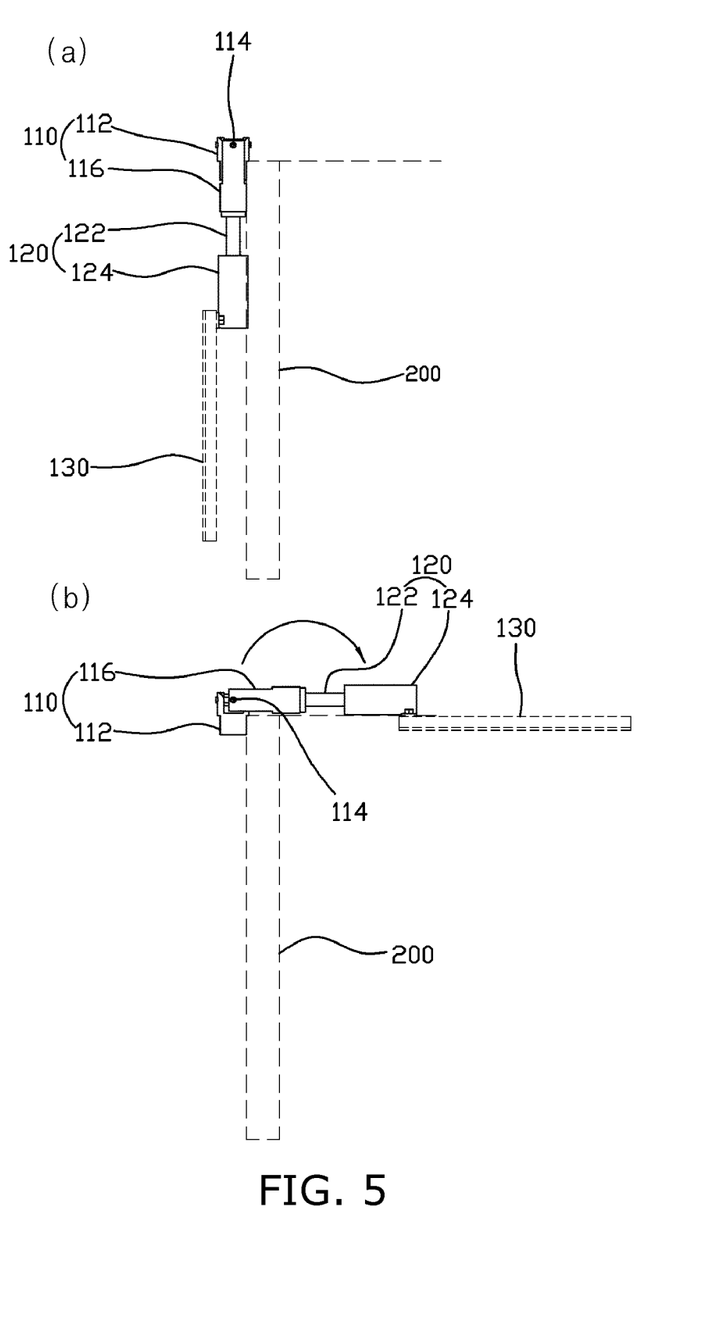
FIGS. 5(a) and 5(b) are schematic front views showing the operation of the hinge according to the preferred embodiment of the present invention.
Figure 6:
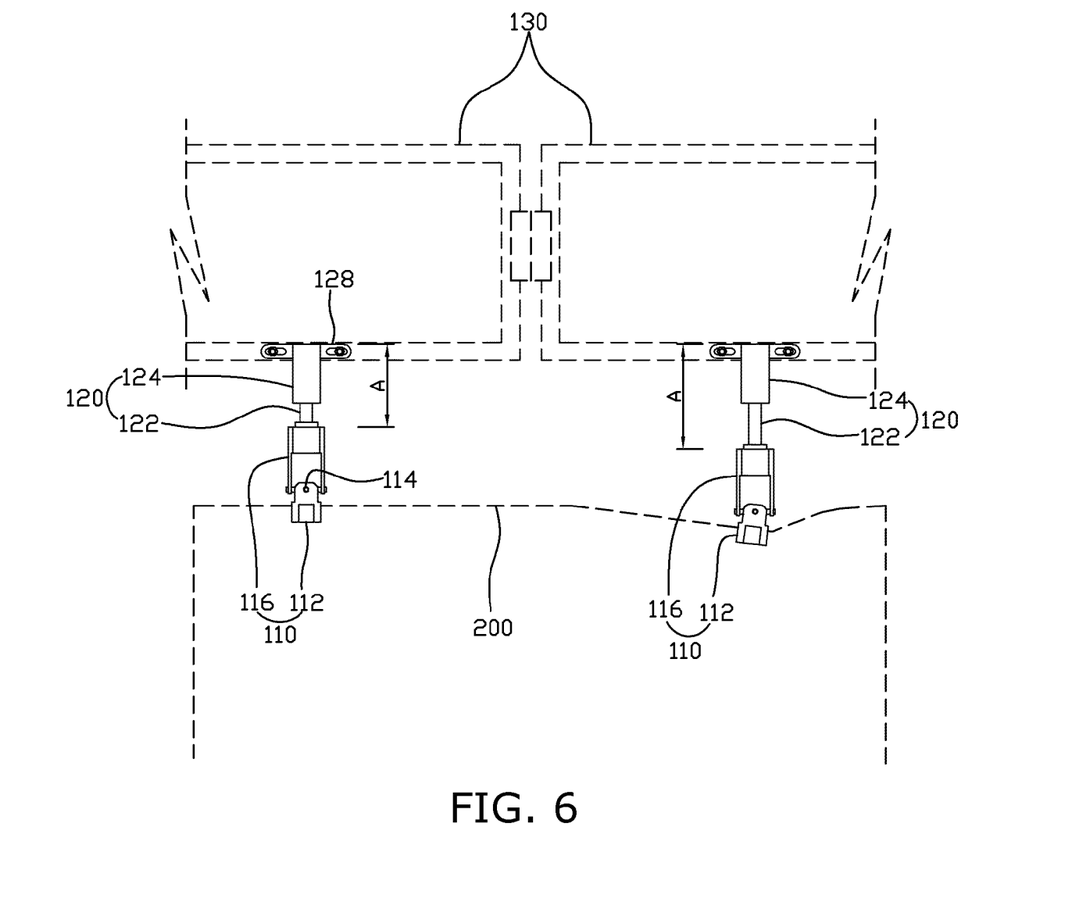
FIG. 6 is a schematic side view showing the operation of the variable member according to the preferred embodiment of the present invention.

FIG. 3 is an enlarged perspective view showing a hinge unit and a variable member according to a preferred embodiment of the present invention, FIG. 4(a) is an exploded perspective view showing the hinge unit and the variable member according to the preferred embodiment of the present invention, FIG. 4(b) is a longitudinal sectional view showing the coupling between the hinge unit and the variable member, FIGS. 5(a) and 5(b) are schematic front views showing the operation of the hinge according to the preferred embodiment of the present invention, and FIG. 6 is a schematic side view showing the operation of the variable member according to the preferred embodiment of the present invention.

First, as shown in FIGS. 3 and 4, each of the hinge units 110 includes a fixed element 112 which is attached to the top surface of a side wall of the truck cargo box 200 shown by dotted lines, and a rotating element 116 which is coupled to the fixed element 112 via a cross-shaped hinge 114 so that it can be hinged in the widthwise and lengthwise directions of the cargo box 200. In this case, the reason why the rotating element 116 is hinged in the widthwise direction of the cargo box 200 is to allow the cover 130 to be selectively opened and closed, and the reason why the rotating element 116 is hinged in the longitudinal direction of the cargo box 200 is to allow the rotating element 116 to be hinged when deformation, such as the twisting of the cargo box 200, occurs, thereby enabling the apparatus to deal with the deformation, i.e., to compensate for the deformation.

Meanwhile, the rotating element 116 needs to be provided to be hinged over at least 270 degrees, i.e., to be rotatable, in order to support the opening and closing operation of the cover 130. For this purpose, it is preferred that interference be prevented during rotation by allowing the fixed element 112 to be completely accommodated in a cutout hole 118 formed in the lower portion of the rotating element 116. In this case, a method by which the rotating element 116 is rotatable over at least 270 degrees without the interference of the fixed element 112 may include various methods, including the shown method, a method of moving a rotating shaft outward, etc. It is to be appreciated that the present application includes all the above methods, and it is made clear that this configuration is not limited.

Next, as shown in FIGS. 3 and 4, each of the variable members 120 is configured to include a piston rod 122 which is coupled to the top surface of the rotating element 116 of the hinge unit 110 and on an end of which is formed a support protrusion 123 protruding outward, a cylinder 124 which is vertically movably coupled to the upper end of the piston rod 122 and on the top of which is provided a coupling portion 128 configured to couple the cover 130, and spring members 126 which provide elastic force by supporting the top and bottom of the support protrusion 123 of the piston rod 122 inside the cylinder 124. When the above configuration is provided, the length of the cylinder 124 is varied within the range of contraction of the spring members 126. Furthermore, it is preferable that slide holes be formed in the coupling portion 128 provided in the cylinder 124 so that the mounted cover 130 is movable in the longitudinal direction of the cargo box 200 within a predetermined range when the cover 130, is mounted, thereby enabling the apparatus to compensate for deformation even when the shape of a load or the cargo box is deformed in the process of selectively opening and closing the cargo box 200.

Next, as shown in FIGS. 5(a) and 5(b), the fixed element 112 of the hinge unit 110 is fixedly installed the upper end of a side wall of the cargo box 200, and rotates the cover 130 coupled to the upper end of the variable member 120 due to the rotation of the rotating element 116 coupled via the cross-shaped hinge 114, thereby allowing the top opening of the cargo box 200 to be selectively opened and closed. In this case, the rotating element 116 is provided in the state of being rotatable not only in the widthwise direction of the cargo box 200, i.e., the direction which allows the cover 130 to be selectively opened and closed, but also in the longitudinal direction of the cargo box, and thus flexibility is ensured even when the shape of the cargo box 200 is deformed, thereby enabling a stable opening and closing operation.

Furthermore, as shown in FIG. 6, the piston rod 122 of the variable member 120 is coupled to the top of the rotating element 116 of the hinge unit 110, and the cylinder 124 is mounted on the cover 130. In this state, even when deformation in which a specific portion of the cargo box 200 sags occurs, the rotating element 116 of the hinge unit 110 provided on the portion is bent and the length A of the variable member 120 is increased, thereby compensating for the deformation. Accordingly, a phenomenon in which the cover 130 is deformed can be prevented and the occurrence of the troubles of respective components, including the axial deformation and damage of the hinge unit 110 which may occur when the cargo box 200 sags, can be minimized, thereby enabling a stable opening and closing operation.

As a result, a flexible countermeasure can be taken via the hinge unit 110 configured to be hinged in various directions by using the cross-shaped hinge 114 as an axis and the variable member 120 configured such that the length thereof is variable even when the deformation of the shape of the cargo box 200 occurs, thereby enabling the stable opening and closing operation of the cover.

Figure 7:
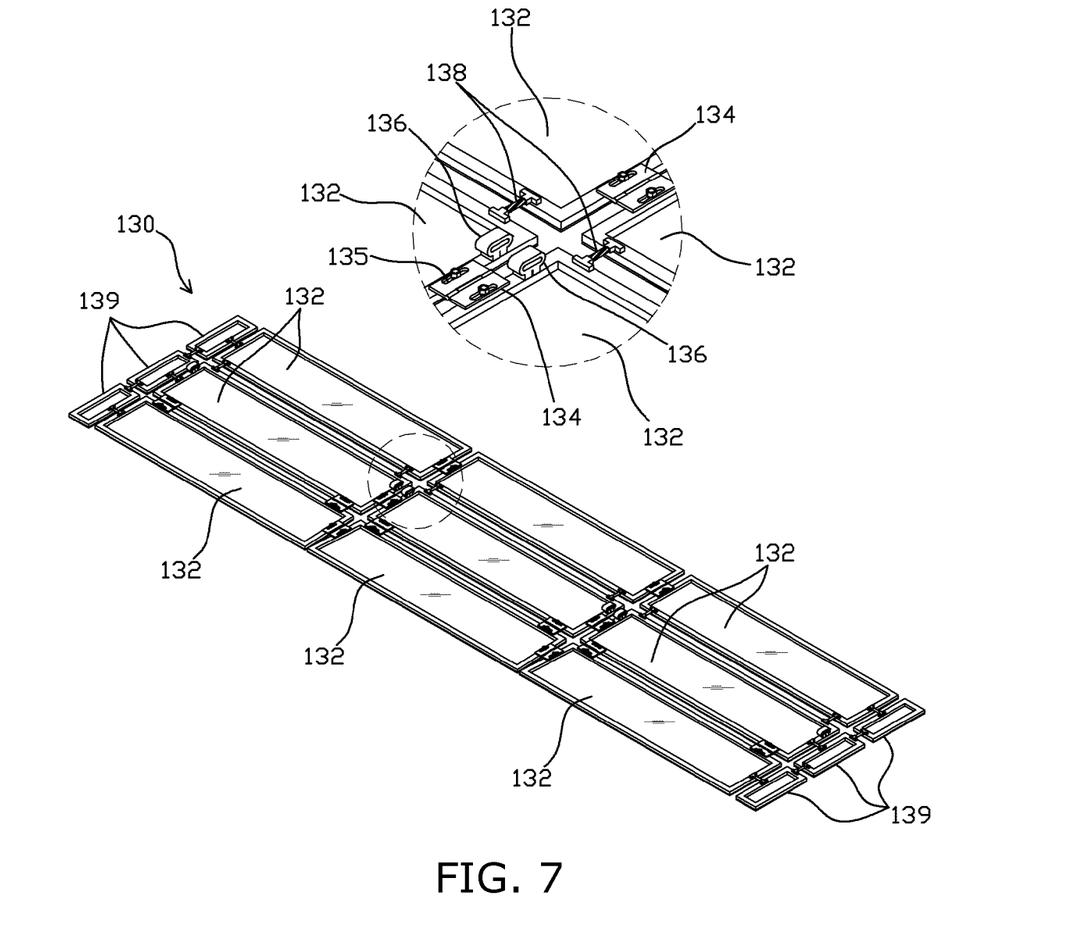
FIG. 7 is a perspective view showing a cover according to a preferred embodiment of the present invention.
Figure 8:
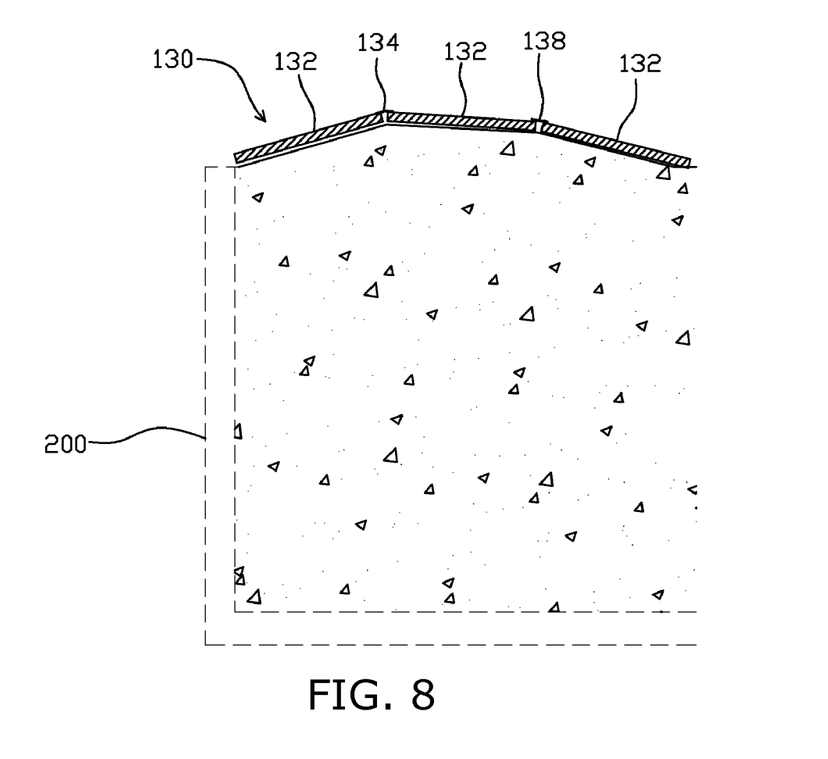
FIG. 8 is a schematic front view showing a state in which the cover according to the preferred embodiment of the present invention is used.

FIG. 7 is a perspective view showing a cover according to a preferred embodiment of the present invention, and FIG. 8 is a schematic front view showing a state in which the cover according to the preferred embodiment of the present invention is used.

First, referring to FIG. 7, each of the covers 130 according to the present invention is configured in such a manner that a plurality of blocks 132 is coupled to one another, and the individual blocks 132 are configured to be connected via hinge assemblies 134 in order to be bent, thereby enabling the covers 130 to stably cover a load having an irregular shape which is loaded into the cargo box 200.

Preferably, the cover 130 is formed in such a manner that a plurality of blocks 132 is connected. It is preferable that at least two rows, most preferably three rows, be formed in the widthwise direction of the cargo box 200. Individual blocks 132 constituting first and second rows are connected to each other via the hinge assemblies 134 and configured to be bendable, and brackets 136 are provided on individual blocks 132 constituting the second row in longitudinal directions In this case, the individual blocks 132 constituting the second row and individual blocks 132 constituting a third row are connected to one another by wires 138 having elastic force rather than hinge assemblies 134. The reason for this is to prevent bending and provide some flexibility when the cover 130 is rotated. In other words, the brackets 136 are provided on the blocks 132 of the second row as described above, and thus the rotational driving means 140, which will be described later, rotates the cover 130 in the state of connecting the brackets 136. The rotation operation may cause a bending problem in the case where the individual blocks 132 constituting the third row are connected by hinge assemblies 134. Accordingly, the above configuration is intended to prevent this problem.

Furthermore, it is preferable that slide holes 135 are formed in the hinge assemblies 134 connecting the individual blocks 132 so that movement can be performed in the widthwise or longitudinal direction of the cargo box 200.

As a result, as described above, the cover 130 is configured in a form in which a plurality of blocks 132 is connected to one another, and the hinge assemblies 134 are provided on the connection portions of the blocks 132. Accordingly, the individual blocks 132 are configured to be bent. The cover 130 can cover a load in accordance with the shape thereof, as shown in FIG. 8. In this case, it will be apparent that wires 139 having elastic force may be used in place of the hinge assemblies 134 that connect the individual blocks 132.

Meanwhile, it is more preferable that auxiliary covers 139 be additionally provided at the respective front and rear ends of each of the rows constituting the cover 130. In other words, in a process in which the cover 130 covers a load, a case where the cover 130 is swollen in a pyramid shape due to the shape of the load, i.e., a case where the front and rear sides of the cover 130 are spaced apart from the cargo box 200, may occur. The reason for this is that in this case, the provided auxiliary covers 139 naturally sag and come into close contact with the cargo box 200 thereby enabling the load to be completely covered. It is preferable that these auxiliary covers 139 be connected via the wires 138 having elastic force which connect the second and third rows of the cover 130, thus sagging naturally and then covering the load and also preventing the phenomenon of complete bending during an opening and closing operation.

Figure 9:
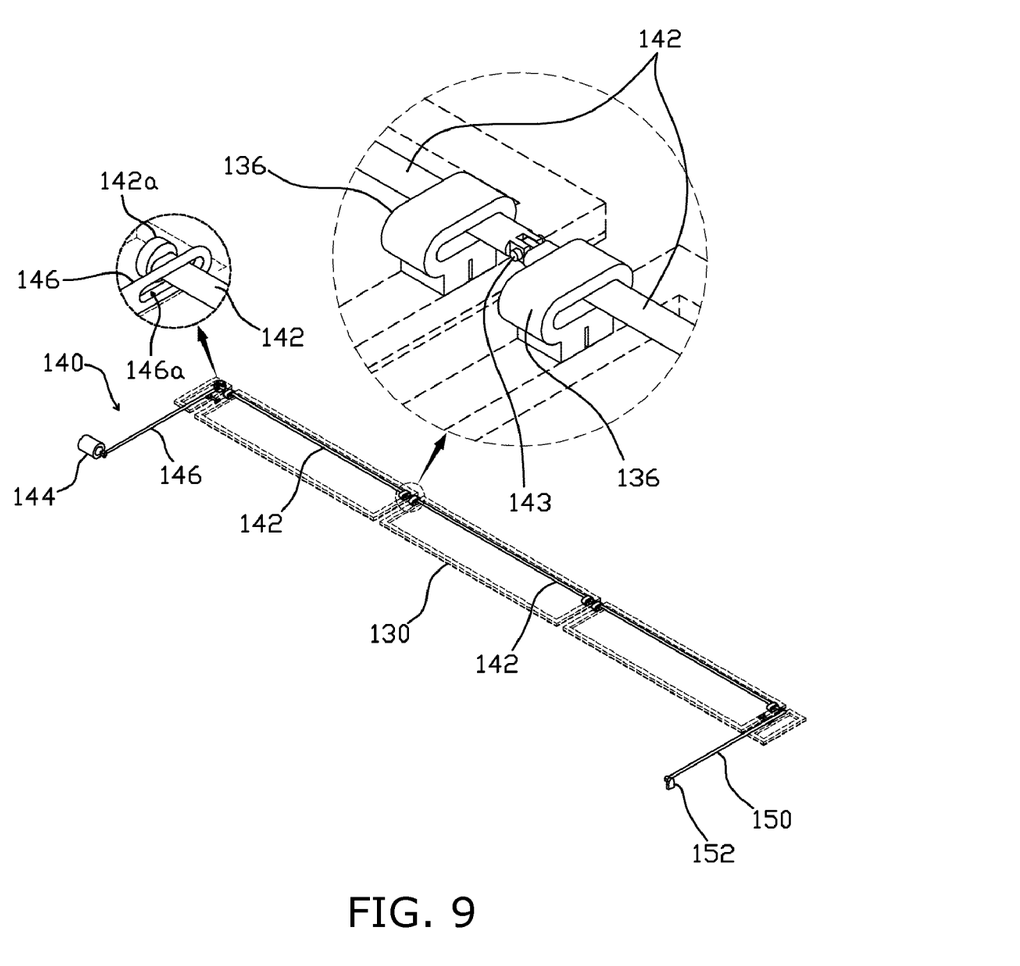
FIG. 9 is a perspective view showing a rotational driving means according to a preferred embodiment of the present invention.

FIG. 9 is a perspective view showing a rotational driving means according to a preferred embodiment of the present invention.

Referring to the drawing, the rotational driving means 140 according to the present invention is configured to include an operation rod 142 which passes through the brackets 136 installed on the cover 130, a rotation motor 144 which, although in this case, is not shown, is provided on one side of the cargo box 200 and performs forward and reverse rotation, a connection bar 146 which connects the rotation motor 144 and the operation rod 142 and transfers rotating force, and a guide bar 150 which is disposed on a side opposite to the rotation motor 144 and in which one end thereof is rotatably installed at the upper end of the cargo box 200 via a bearing 152 and the other end thereof is coupled to an end of the operation rod 142 so that the guide bar 150 prevents a phenomenon in which the cover 130 sags by supporting the cover 130 while being rotated together with the cover 130 during the opening and closing operation of the cover 130, thereby enabling a stable opening and closing operation. In this case, it is preferable that the operation rod 142 be configured to be bendable via coupling shafts 143 between the brackets 136 provided on the blocks 132 constituting the cover 130, thereby preventing trouble from occurring when the blocks 132 are bent. Meanwhile, it will be apparent that the shaft of the rotation motor 144 be provided to be located on the same horizontal line as the shafts of the cross-shaped hinges 114 of the above-described hinge units 110. Furthermore, it is preferable that the reception holes of the brackets 136 and the operation rod 142 passing through these reception holes be configured to have an elliptical shape, and thus rotating force can be transferred and also clearance spaces are provided to the reception holes, thereby enabling a countermeasure to be taken against the movement of the cover 130.

When the above configuration is provided, the cover 130 may selectively open and close the cargo box 200 by the forward and reverse rotation of the motor 144.

Meanwhile, it is preferable that a slide hole 146a be formed in an end of the connection bar 146, a stop protrusion 142a be formed at an end of the operation rod 142, and they be coupled to each other, as shown in the partially enlarged view, thereby enabling compensation for an opening and closing operation or deformation.

Furthermore, the guide bar 150 is proposed to ensure the smooth and stable operation of selectively opening and closing the cover and prevent a phenomenon in which the cover sags on a side opposite to the rotation motor 144 which generates driving force. It is obvious that the guide bar 150 is not limited to the illustrated shape. It should be noted that a configuration in which the guide bar 150 has the same structure as the rotation motor 144, supports the cover, generates driving force, and selectively opens and closes the cover in conjunction with the rotation motor 144 may be sufficiently taken into consideration and is also included in the present invention.

The foregoing description has described rather broadly the features and technical advantages of the present invention in order to allow the following claims of the invention to be better understood. Additional features and advantages that constitute the claims of the present invention will be described in detail below. It should be appreciated by those skilled in the art that the disclosed concepts and specific embodiments of the invention may be used immediately as a basis for designing or modifying other structures to accomplish the invention and similar purposes.

Furthermore, the concepts and embodiments of the inventions disclosed herein may be used by those skilled in the art as a basis for modifying or designing other structures to accomplish the same purposes of the present invention, and such equivalent modifications or alterations may be made without departing from the spirit and scope of the invention described in the attached claims.

The invention claimed is:

1. A cover apparatus for a truck cargo box, the cover apparatus comprising:
   a plurality of hinge units which is attached in longitudinal directions of a truck cargo box, and each of which includes a fixed element attached to a top surface of a side wall of the truck cargo box and a rotating element coupled to the fixed element via a cross-shaped hinge so that it can be hinged in widthwise and lengthwise directions of the cargo box;
   variable members which are coupled to tops of the hinge units, and lengths of which are variable in accordance with deformation of a shape of the cargo box;
   covers which are coupled to tops of the variable members, and which selectively open and close a top opening of the cargo box in response to hinge operations of the hinge units; and
   rotational driving means which enable opening and closing operations of the covers to be automatically performed.

2. The cover apparatus of claim 1, wherein each of the variable members comprises:
   a piston rod which is coupled to a top surface of the rotating element of the hinge unit, and on an end of which is formed a support protrusion protruding outward;
   a cylinder which is coupled to an upper end of the piston rod, which is vertically movably, and on a top of which is provided a coupling portion configured to couple the cover; and
   spring member which provide elastic force by supporting a top and bottom of a support protrusion of the piston rod inside the cylinder.

3. The cover apparatus of claim 1, wherein each of the covers is configured in such a manner that a plurality of blocks is coupled to one another, and the individual blocks are configured to be connected via hinge assemblies in order to be bent, thereby enabling the covers to cover a load having an irregular shape, loaded into the cargo box, while flexibly dealing with the load.

4. The cover apparatus of claim 3, wherein the cover includes at least two rows formed in widthwise directions of the cargo box.

* * * * *